United States Patent [19]

Danon

[11] 4,033,374

[45] July 5, 1977

[54] LATCH ASSEMBLY FOR SLAM-SHUT VALVES

[75] Inventor: Joseph Solomon Danon, El Toro, Calif.

[73] Assignee: The Singer Company, New York, N.Y.

[22] Filed: June 2, 1976

[21] Appl. No.: 692,162

[52] U.S. Cl. .............................. 137/461; 137/463; 251/73

[51] Int. Cl.² ........................................ F16K 17/00

[58] Field of Search ................. 137/461, 462, 463; 251/73

[56] References Cited

UNITED STATES PATENTS 2,924,235 2/1960 Knudson ............................ 137/461

*Primary Examiner*—Harold W. Weakley
*Attorney, Agent, or Firm*—Edward L. Bell; Robert E. Smith; Harold Weinstein

[57] ABSTRACT

A slam-shut valve provides overpressure protection in a pipeline in the event of pressure regulator failure. The slam-shut valve is normally held in the open position by a latch assembly. Overpressure or failure of the regulator will automatically trigger operation of the slam-shut valve to close the same and prevent further passage of the gas through the pipeline. The reset assembly must be manually operated to re-engage the latch assembly so as to open the slam-shut valve once it has been triggered closed.

The latch assembly coacts with a release assembly having a release shaft which detachably holds a spring latch affixed to a lever pivotally mounted upon the reset shaft of the reset assembly.

Subsequent to its release, the spring latch will be re-engaged with the release shaft in order to reopen the slam-shut valve. Dependent upon the position of the release shaft, the spring latch may be required to deflect prior to relatching upon the release shaft. Otherwise, the lever of the reset assembly will reposition the release shaft in the raised position upon the spring latch being re-engaged therewith.

In any event, the latch assembly provides for low-friction, binding-free release of the reset assembly promptly to close the slam-shut valve once an overpressure condition triggers operation thereof.

6 Claims, 13 Drawing Figures

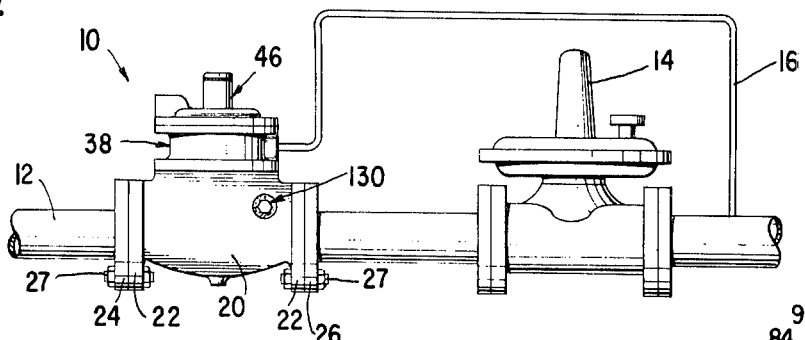
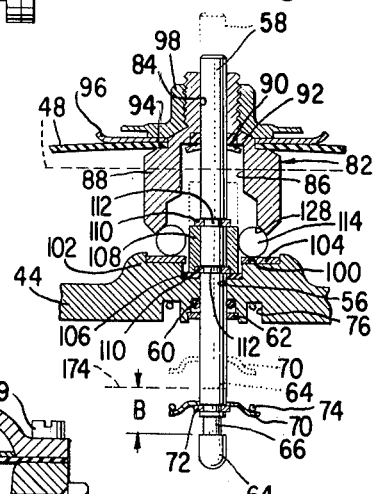
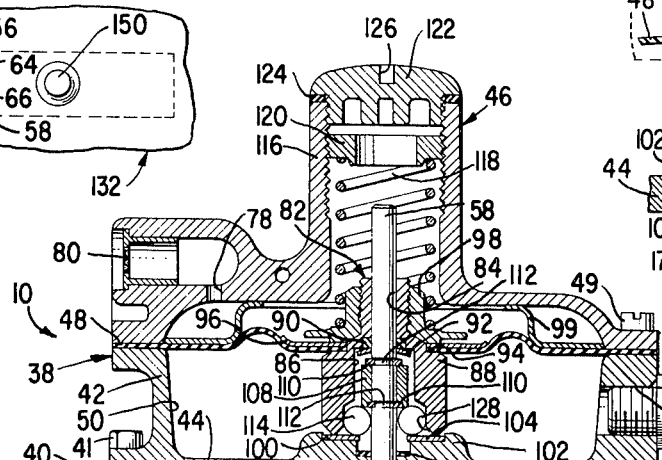
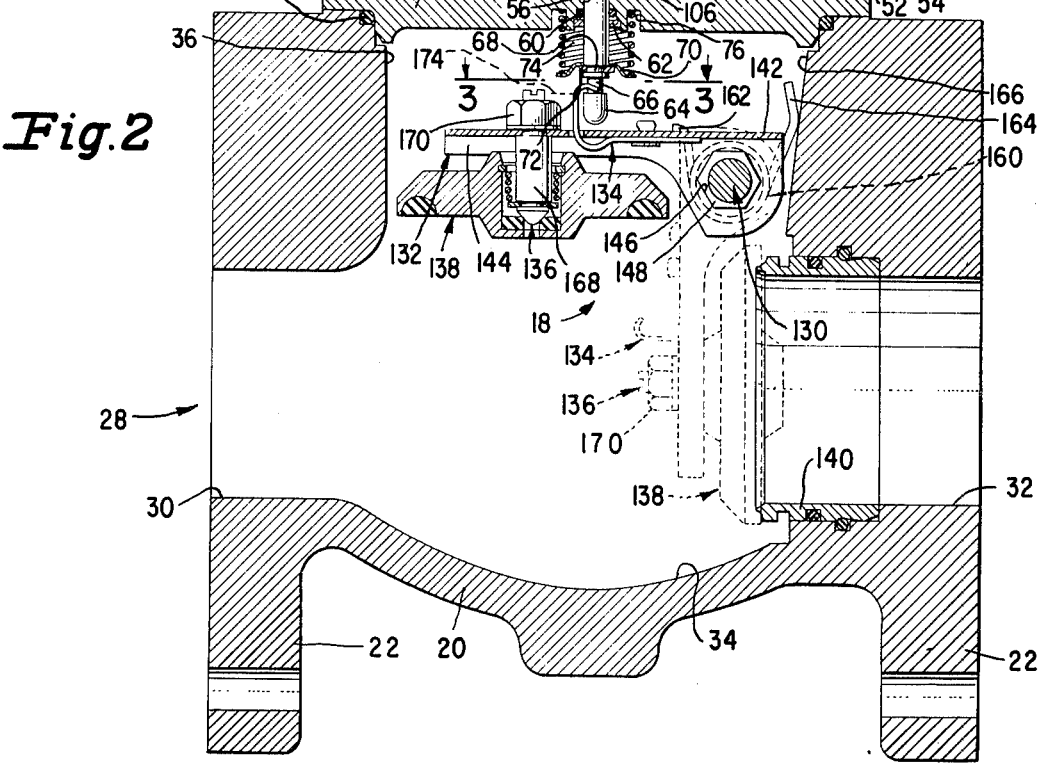

LATCH ASSEMBLY FOR SLAM-SHUT VALVES

BACKGROUND OF THE INVENTION

Heretofore, the slam-shut valves of the prior art have used rigid latch assemblies with various kinds of reset assemblies. The prior art use of rigid latches increased the frictional forces required to accomplish release, and consequently, closing of the slam-shut valve. Also, resetting of the slam-shut valve was more difficult.

SUMMARY OF THE INVENTION

It is therefore an obhject of the present invention to provide an improved latch assembly for slam-shut valves which overcomes the prior art disadvantages; which is simple, economical and reliable; which improves the release characteristics of the latch and is operationally low friction; which latch is a spring member readily deflectable; which latch assembly is affixed to the lever of the reset assembly and coacts with the release assembly to position the slam-shut valve open or close; and which latch is releasably engaged with the release shaft when the slam-shut valve is in the open position.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 1 is a side elevational view showing a typical installation with the slam-shut valve connected in a pipeline upstream of and in series with a pressure regulator.

FIG. 2 is a sectional side elevational view of the slam-shut valve embodying the latch assembly of the present invention.

FIG. 3 is a top plan view, taken along line 3—3 of FIG. 2.

FIG. 4 is a sectional side elevational view showing the release shaft in its released position.

FIGS. 5, 6, and 7 are a diagrammatic representation of the slam-shut valve moving from the open position to the closed position wherein: FIG. 5 shows the valve open; FIG. 6 shows the releasing shaft dropping vertically downwardly to release the latch; FIG. 7 shown the valve closed.

FIGS. 8, 9 and 10 are a diagrammatic representation of the slam-shut valve with the release shaft already raised and locked in its raised position and the reset assembly operated to relatch the valve open wherein: FIG. 8 shows the reset assembly being moved from closed to contact the release shaft; FIG. 9 shows the latch deflected as the lever continues to be pivoted upwardly. FIG. 10 shows the reset assembly in latched position with the valve open.

FIGS. 11, 12 and 13 are a diagrammatic representation of the slam-slut valve being reset into the open position wherein: FIG. 11 shows the release shaft in its lowest position about to be raised by the reset assembly; FIG. 12 shows the release shaft held in raised position and the lever not yet released; FIG. 13 shows the lever released and the latch engaging the release shaft to hold the slam-shut valve in open position.

DESCRIPTION OF THE INVENTION

Figure 5:
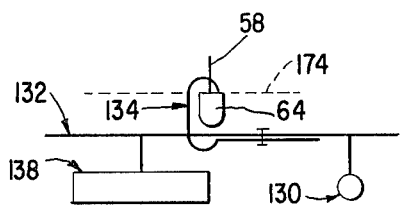

The slam-shut valve, designated generally as 10, embodying the present invention, is illustrated in FIG. 1 as being embodied in a gas pipeline or system 12, upstream of a pressure regulator 14. A pressure sensing line 16 is connected to communicate the pressure in the pipeline 12 downstream of the pressure regulator 14 to the slam-shut valve 10. When the pressure communicated by line 16 to the slam-shut valve 10 increases above a preset "trip" pressure, the slam-shut valve 10 will automatically trip, as more fully described hereinafter, to close the valve 10 and prevent any further flow to the downstream side thereof and of pipeline 12. Once the cause of the overpressure condition has been corrected, the slam-shut valve 10 can be manually reset to reinstate the flow in pipeline 12 by use of a reset assembly, designated generally 18. The reset assembly 18 is shown in FIG. 2, to be open in the solid line representation, and to be closed in the dotted line representation.

The slam-shut valve 10 has a housing 20 formed with annular radial flanges 22, 22 at either axial end thereof which serve to connect the slam-shut valve 10 to corresponding flanges 24 and 26 of the pipeline 12 by studs 27, shown only in FIG. 1.

The housing 20 illustrated in FIG. 2 includes a central flow passage 28 extending substantially axially for alignment with corresponding flow passages in the pipeline 12. Flow passage 28 has an inlet portion 30 and an outlet portion 32, each of which, communicate with a central valve chamber 34 therein. The chamber 34 extends upwardly from the flow passage 28, and terminates in an open top 36 of the housing 20, which is enclosed by a diaphragm housing 38 with the connection therebetween sealed by an O-ring 40. The diaphragm housing 38 is connected to the housing 20 by bolts 41, only one of which is shown in FIG. 2.

The diaphragm housing 38 has a bowl-shaped lower portion 42, the bottom wall 44 of which carries the O-ring 40 and nests upon the housing 20 to close the top opening 36 of the chamber 34. A top portion 46 of housing 38 sandwiches the peripheral edge of a diaphragm 48 between itself and the lower portion 42 to which it is sealingly connected by screws 49 shown only in FIG. 2. A pressure chamber 50 is formed in the interior of the lower portion 42 below the diaphragm 48. The sensing line 16 communicates with pressure fitting chamber 50 and carries a fitting 52 at the valve end thereof, which is threadedly received in an aperture 54 formed in the side wall of the lower portion 42. The bottom wall 44 has a bore 56 therein through which a release shaft 58 extends. An O-ring 60 provides a seal about the underside of the bottom wall 44 at the point the shaft 58 egresses, and the O-ring is retained in position by a retainer ring 62, as shown in FIGS. 2 and 4.

The lower end 64 of the shaft 58 illustrated in FIGS. 2 and 4 is round and smooth with an annular groove 66 spaced from and adjacent to the end 64. A narrow recess 68 is formed above the groove 66. A spring holder 70 is mounted at the recess 68 by a retainer 72 disposed in the recess 68 and carries the lower end of a release spring 74, the upper end of which, is disposed in an annular recess 76 which is formed in the bottom wall 44 outwardly of and spaced from the O-ring 60. The spring 74 urges the release shaft 58 in the downward direction as viewed in FIG. 2, and is shown in FIG. 4.

The pressure chamber 50 is exposed to the pressure in the pipeline 12 on the downstream side of pressure regulator 14 via the sensing line 16. The upper side of the diaphragm 48 is vented to the atmosphere through a passageway 78 and a vent screen 80.

A holding mechanism includes a ball cage 82 illustrated in FIGS. 2 and 4 which essentially is cup-shaped. The cage 82 has a bore 84 through which the shaft 58 extends and a counterbore 86 which defines a skirt 88 and an annular space between the shaft and the skirt 86. An O-ring 90 and retaining washer 92 are provided at the interface of the bores 84 and 86 to provide a seal with the periphery of the shaft 58. However, the shaft 58 and the ball cage 82 are independently movable with respect to each other.

The center of the diaphragm 48 illustrated in FIGS. 2 and 4, is positioned upon an annular shoulder 94, and the diaphragm is retained by a diaphragm plate 96 and a diaphragm nut 98, threaded onto the reduced diameter upper end of the ball cage 82. An annular limited plate 99 is disposed above the diaphragm 48 in spaced relation to plate 96 to limit the movement of the diaphragms 48 at its outer periphery remote from plate 96. The inner upper end of the limiter plate 99 contacts the upper portion 46 of housing 38 adjacent its central opening so as not to interfere with the free movement of the remainder of the diaphragm 48 and/or the release shaft 58. A stepped bore 100 is provided in a raised central portion 102 of the bottom wall 44, and a ball plate or washer 104 is positioned at the upper surface of the bore 100, while a resilient washer 106 of smaller diameter is positioned about the shaft 58 at the lower surface of the bore. A collar 108 is secured to the shaft 58 by a pair of retainer rings 110, 110 affixed in recesses 112, 112 formed in the shaft 58 on either side of the collar 108. A plurality of balls 114 are positioned about the periphery of the shaft 58 in the annular space defined by the shaft 58 and the skirt 88 of the ball cage 82. The balls 114 are radially restrained as illustrated in FIG. 2, by the ball cage 82 so as to contact the underside of the collar 108 affixed to the release shaft 58. This serves to hold the release shaft 58 in holding or upper position in which it remains locked or cocked prior to its release.

The upper portion 46 of the diaphragm housing 38 shown in FIG. 2 includes a dome 116 for housing a pressure spring 118, the lower end of which is disposed about the diaphragm nut 98 to provide a predetermined bias on the diaphragm 48. The force of the spring 118 against the diaphragm 48 may be adjusted by varying the position of a threaded spring seat member 120, which is threadedly engaged in the internally threaded upper portion of the dome 116. Access to the seat member 120 and spring 118 is gained by removing a plug 122 which is threadedly engaged to the dome 116 above the spring member 120 to close the open upper end thereof. A gasket 124 is disposed between the plug 122 and the dome 116 to seal the connection therebetween.

The spring 118, or adjustment thereof, determined the pressure required on the underside of the diaphragm 48 to trigger or release the holding mechanisms of the release shaft 58. A slot 126 is provided in the plug 122 for receiving the end of a suitable tool, such as a screwdriver or the like, for facilitating the rotation of the plug 122 for its connection to or removal from the dome 116.

In the event that a predetermined overpressure condition is communicated via sensing line 16 to the pressure chamber 50, the diaphragm 48 will rise from the dotted line to the solid line position, as illustrated in FIG. 4 due to the increased pressure, thereby causing the ball cage 82 to also rise. This action frees the ball 114 and allows them to move radially outwardly of the shaft 58, under pressure from the spring 74 transmitted through the collar 108, thereby releasing the collar 108 and allowing the shaft 58 to drop vertically downwardly to the tripped or released lower position depicted in FIG. 4 for purposes more fully described hereinafter. In order to accomplish the releasing action, the balls 114 move along the inclined face 128 of the inner edge of the skirt 88 of the cage 82. If the holding mechanism has been tripped, subsequent correction of the overpressure condition will not automatically cause the release shaft 58 to be raised or cocked, but this may be done through the operation of the reset assembly 18, as described hereinafter.

The reset assembly 18 illustrated in FIG. 2 is composed of various subassemblies which include such components as the reset shaft 130, which pivotally carries the lever 132 to which is affixed a resilient latch 134 releasably held within the groove 66 of the release shaft 58. Also included, is an equalizing valve 136 which interconnects the lever 132 and a valve element or seat disc 138 designed to coact with a valve seat or seat ring 140. The reset shaft 130 is mounted within the housing 20 in the upper portion of the central chamber 36 at a location above and transverse to the central flow passage 28, as illustrated in FIG. 2.

The lever 132 illustrated in FIG. 2 has a flat body portion 142 with a downturned side flanges 144, only one of which is shown being narrow at the forward end and ear-shaped at the end adjacent the reset shaft 130. A hexagon socket 146 is formed in the ear portion of each of the flanges 144, and is sized to receive a hexagon bolt head 148 formed on the shank of the shaft 130. The latch 134 is riveted as at 150 to the underside of the body 142 of the lever 132, and extends therefrom through a slot 152 in a vertical direction to terminate in a bent bifurcated end 154 which engages the flat lower surface of the groove 66 as shown in FIGS. 2 and 3, normally to hold the lever 132 in a raised substantially horizontal position illustrated in FIG. 2.

The latch 134 is made of a spring metal which is resilient, such as a spring steel. The latch 134 is shaped and connected so as to be more readily deflective upon contact with an object positioned above the latch 134, while the arc of the bifurcated end 154 will permit simple point contact at each tip 156 upon the surface of the groove 66, as illustrated in FIG. 3.

A closing spring 158 is assembled to coil about the reset shaft 130 and to be confined between the pair of ears of the flanges 144, as shown in FIG. 2. The closing spring 160 has one end 162 thereof extending through an aperture of the body 142 to hook the spring 106 to the lever 132, while the other end 164 thereof pushes against an end wall 166 to urge the lever 132 to pivot counterclockwise about the shaft 130 as viewed in FIG. 2, which movement is normally prevented by the latch 134 engaging the release shaft 58.

The lever 132 illustrated in FIG. 2, is mounted to pivot about the axis of the reset shaft 130. The valve element 138 is interconnected to the body 142 by the shoulder screw 168 and nut 170 of the equalizer valve 136.

The reset shaft 130 has a cage nut 172 shown only in FIG. 1 which is disposed externally of the housing 20 and adapted to be engaged by a wrench or other suitable tool so as to rotate the shaft 130 for purposes more fully described hereinafter.

The slam-shut valve 10 is a two-position valve, open as shown in the solid line drawing of FIG. 2, wherein the lever 132 is in the raised latched position, and closed wherein the lever 132 has been released and forced by the closing spring 160 to rotate counter-clockwise to cause the valve element 138 to seat upon the seat ring 140 and close the outlet passage 32, as shown in the dotted line representation of FIG. 2. Release of the latch 134 is accomplished due to an overpressure condition developing in chamber 50 to cause the diaphragm 48 to be raised from the position shown in FIG. 2 or the dotted line representation shown in FIG. 3 to the vertically raised solid line position shown in FIG. 3, wherein the ball cage 82 is vertically raised sufficiently to release the ball 114 in a radial direction so as also to release the collar 108 and permit the shaft 58 to drop vertically downwardly under the force of the spring 74 to thus cause the bifurcated end 154 of the latch 134 to slip from its engagement with the bottom surface of groove 66 and free the lever 132. This is shown diagrammatically in FIGS. 5, 6 and 7.

Figure 6:
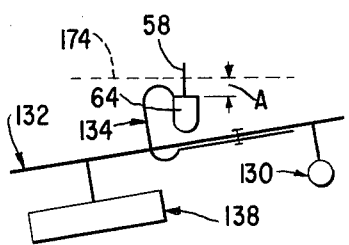
Figure 7:
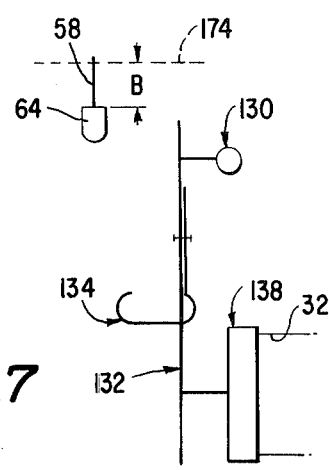

The release shaft 58 illustrated in FIG. 5, is shown in the raised position which corresponds to that shown in FIG. 2, wherein the balls 114 are trapped by the ball cage 82 and hold the collar 108 and consequently the shaft 58 against the tension of the spring 74. The dashed reference line 174 is set at the height of the bottom surface of the groove 66 when the release shaft 58 is in its raised position. However, when the ball cage 82 is raised as was described under FIG. 4, the collar 108 is released from the balls 114 and thus the release shaft 58 is free to drop vertically downwardly, as is shown in FIG. 6, wherein the lever 132 pivots counterclockwise about the axis of the reset shaft 130, while the latch slides from its normal position on the right of the center line of shaft 58 to the leftward side thereof with the latch 134 being shown just prior to complete release from the groove 66. Simultaneously, with the shaft 58 vertically dropping downwardly, the latch 134 sliding leftwardly as viewed in FIGS. 5 and 6, the lever 132 continues to pivot about the shaft 130 so that once the latch 134 is released from the shaft 58, the movement of the lever 132 will be under the force of the spring 160 (shown only in FIG. 2) to complete the closing of the valve element 138 upon the valve seat 140 as shown in FIG. 7.

The reference line 174 shown in FIG. 5 as extending horizontally from the bottom surface of the groove 66, corresponds to the locked position of the release shaft 58 shown in FIG. 2. The distance "B" measured from the reference line 174 to the bottom surface of the groove 66 is equal to the total vertically downwardly movement of the release shaft 58 and will correspond to the travel of the collar 108 from its locked position in FIG. 2 to its resting position upon the pad 106 in FIG. 4. The distance "A" shown in FIG. 6 is the maximum amount of travel vertically downwardly which the release shaft 58 will partake of with the latch 134 still engaging the groove 66. Accordingly, any vertically downwardly movement of the release shaft 58 which exceeds the distance "A" will cause the latch 134 to be released from engagement with the shaft 58 to produce positive closing under the influence of closing spring 160, as illustrated in FIG. 7 and the dotted line representation of the valve element 138, illustrated in FIG. 2.

There are two conditions under which the slam-shut valve 10 will have closed, one being the overpressure in the chamber 50 which produces the release of the shaft 58 to trigger the closing of the valve element 138 upon release of the latch 134 therefrom. The other condition will occur subsequent to servicing of the diaphragm housing wherein the latch 134 has been released but the shaft 58 remains in the raised locked position, shown in FIG. 2. It is the latter condition which will be discussed under FIGS. 8, 9 and 10.

Figure 8:
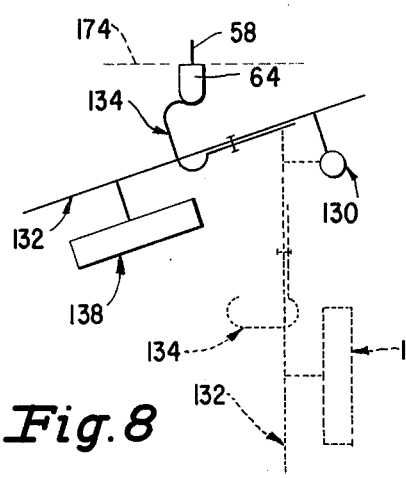
Figure 9:
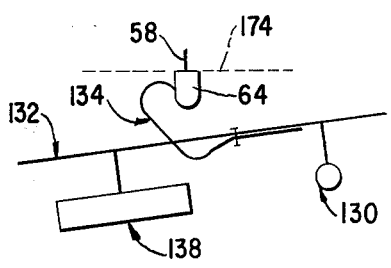
Figure 10:
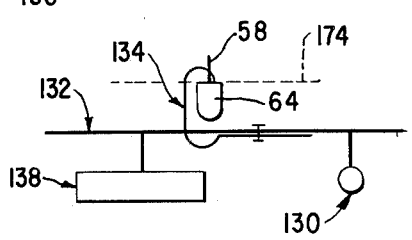

The reference line 174 is shown at the bottom surface of the groove 66 which indicates the release shaft 58 is in the raised locked position depicted in FIG. 2, and shown diagrammatically in FIG. 8. The cage nut 172, shown only in FIG. 1, of reset shaft 130 will be engaged by a suitable tool (not shown), to cause the lever 132 to be rotated clockwise from its dotted line position illustrated in FIG. 8, sufficiently to have the spring latch 134 contact the smooth rounded tip of the release shaft 58 which, being in the raised locked position, will remain substantially rigid. The latch 134 being a spring member, will yield and substantially deflect as illustrated in FIG. 9 as the lever 132 continues to rotate in the clockwise direction. Being that each of the shapes are rounded and the initial contact is made on the same side of the center line of the shaft 58 as that in which the deflection occurs, little force is required to accomplish the necessary deflection and the resetting operation will be able to proceed smoothly. Once the lever 132 has been raised to the substantially horizontal position illustrated in FIG. 10, the latch 134 will have passed over the tip to enter the groove 66 wherein it will spring back to its undeflected condition and the bifurcated ends 156 will cross over the center line of the shaft 58 to assume the latched position shown in both FIG. 10 and FIG. 2. Though the diagrammatic representation shown in FIGS. 8, 9 and 10 show point contact between the release shaft 58 and the latch 134, as was set forth under FIG. 3, it will be understood that the construction of the latch 134 includes a bifurcated end 154 so that rather than point contact, a line contact may also occur without substantially increasing the frictional drag between the two components.

Figure 11:
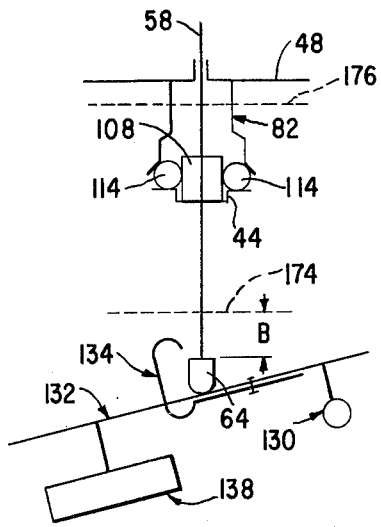
Figure 12:
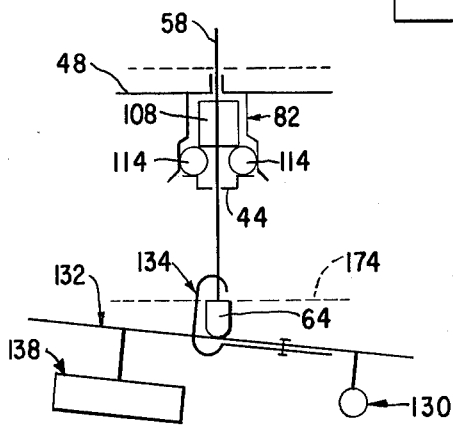
Figure 13:
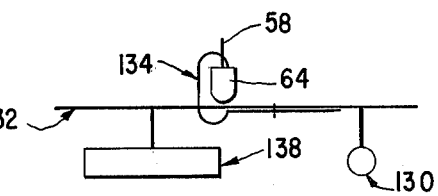

Whenever resetting is required, after correction of an overpressure condition producing the release of the shaft 58, the steps to be followed are diagrammatically represented in FIGS. 11, 12 and 13. The position of the diaphragm 48 is dictated by the relative position of the ball cage 82, and prior to resetting of the collar 108, the diaphragm will remain raised as shown by the solid line thereof, even though the position it would seek to assume responsive to the pressure condition were the horizontally lower dotted line 176. The reset shaft 130 illustrated in FIG. 11 is rotated clockwise to raise the lever from the closed valve position to contact the bottom of the release shaft 58 with the latch 134 out of engagement with the shaft 58. The release shaft 58 moves independently of the diaphragm 48 and continued clockwise rotation of the reset shaft 130 causes the release shaft 58 to be vertically raised sufficiently to raise the collar 108 above the balls 114 to permit their being shifted radially inwardly under the pressure of the spring 118 transmitted through the ball cage 82 to recock the release mechanism and engage the underside of the collar 108 to once again hold the release shaft 58 in its raised locked position, as illustrated in FIGS. 12 and 2. In order to accomplish this, the lever 132 has been raised slightly above the horizontal, which places the latch over the center line of the shaft 58 and though within the groove 66 out of contact with the bottom edge thereof. However, the release shaft 58 remains in its locked position, so that the closing spring 160 or positioning of the reset shaft 130 will restore the lever 132 to the horizontal position, thus re-engaging the bifurcated ends 154 of the latch 134 with the bottom edge of the groove 66 to complete the re-latching of the reset assembly 18, as illustrated in FIG. 13. In this position, the reset assembly will correspond to that shown in the solid line representation of FIG. 2.

It will be understood that various changes in the details, materials, arrangements of parts and operating conditions which have been herein described and illustrated in order to explain the nature of the invention, may be made by those skilled in the art within the principles and scope of the invention.

Having thus set forth the nature of the invention, what is claimed herein is:

1. A slam-shut valve comprising:
   a. a housing having an inlet and an outlet in communication with a chamber therebetween,
   b. a diaphragm housing connected to the valve housing above the chamber,
   c. a diaphragm mounted in the diaphragm housing,
   d. a pressure chamber formed on one side of the diaphragm in communication with line pressure to signal an overpressure condition which will cause the diaphragm to expand,
   e. a release shaft journaled in the diaphragm housing,
   f. a release mechanism connected to the diaphragm normally to hold the release shaft in locked raised position and upon expansion of the diaphragm to release the shaft and to permit the shaft to drop vertically downwardly,
   g. the release shaft having one end extending into the chamber, with a groove formed adjacent said end,
   h. a reset shaft journaled in the chamber and adapted to be rotated about its axis therein,
   i. a lever pivotally mounted upon the reset shaft and adapted to be raised upon rotation of the reset shaft,
   j. a valve element connected to the lever adapted to close the outlet of the valve, and
   k. a spring latch affixed to the lever to be unidirectionally yieldable upon raising of the lever, and normally to be engaged within the groove of the release shaft to hold the lever and valve element within the chamber in raised position.

2. The combination claimed in claim 1 wherein:
   a. the end of the release shaft disposed in the chamber is round and smooth,
   b. the spring latch extending above the lever a predetermined distance with the end thereof turned downwardly to define a short arc which curves in the opposite direction of the rounded end of the release shaft, and
   c. the spring latch to deflect upon contact between the arcuate end thereof and the rounded end of the release shaft, and to spring into engagement within the groove to re-latch the lever in raised position.

3. The combination claimed in claim 2 wherein:
   a. the rounded end of the spring latch is bifurcated with a central opening formed between two bent downwardly extending fingers, and
   b. the spring latch to engage the groove of the release shaft in latched position with the central opening in the groove and one finger on either side thereof.

4. The combination claimed in claim 3 wherein:
   a. each of the bent fingers of the spring latch to engage the bottom surface of the groove beyond the center line of the release shaft, and
   b. the release shaft being released by an overpressure condition causing it to drop vertically downwardly to slide the bifurcated end of the spring latch out from the groove to permit the lever to pivot and close the valve element upon the outlet of the valve to shut the flow through the slam-shut valve.

5. The combination claimed in claim 4 wherein:
   a. the lever to contact the release shaft and raise the same to re-latch said shaft with the release mechanism subsequent to correction of the overpressure condition, and
   b. the spring latch disposed within the groove of the release shaft upon re-latch of the same by the lever.

6. The combination claimed in claim 1 wherein:
   a. the spring latch connected to the underside of the lever,
   b. the lever having a slot therein,
   c. the spring latch extending through the slot to project upwardly from the lever,
   d. a bifurcated end formed at the upper outer end of the spring latch, and
   e. the bifurcated end bent downwardly adjacent its tip to cause said tip to face the upper surface of the lever in predetermined space relation therewith.

* * * * *